(12) United States Patent
Diard et al.

(10) Patent No.: US 7,619,631 B1
(45) Date of Patent: Nov. 17, 2009

(54) METHODS AND SYSTEMS FOR PERFORMING ANTI-ALIASING OPERATIONS WITH MULTIPLE GRAPHICS PROCESSING UNITS

(75) Inventors: Franck R. Diard, Mountain View, CA (US); Jeffrey A. Bolz, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 450 days.

(21) Appl. No.: 11/391,011

(22) Filed: Mar. 28, 2006

(51) Int. Cl.
*G06F 15/80* (2006.01)

(52) U.S. Cl. ........................ 345/505; 345/502; 345/534; 345/535; 345/536; 345/545; 345/611; 345/615

(58) Field of Classification Search .................. 345/615
See application file for complete search history.

(56) References Cited

U.S. PATENT DOCUMENTS 6,573,905 B1 * 6/2003 MacInnis et al. ............ 345/629
7,398,515 B2 * 7/2008 Atoji et al. .................. 717/126
2006/0267990 A1 * 11/2006 Rogers et al. ............... 345/502

* cited by examiner

*Primary Examiner*—Antonio A Caschera
(74) *Attorney, Agent, or Firm*—Patterson & Sheridan, LLP (57) ABSTRACT

A technique for performing an anti-aliasing operation by multiple graphics processing units includes utilizing a first graphics processing unit to generate a first subset of filtered data resulting from performing anti-aliasing processing and similarly utilize a second graphics processing unit to generate a second subset of filtered data. The first graphics processing unit then pulls a first portion of the second subset of filtered data from a first memory block of a temporary buffer and blends such pulled data with a first portion of the first subset of filtered data. Overlapping in time with the pulling and blending operation of the first graphics processing unit, the second graphics processing unit pulls a second portion of the first subset of filtered data from a second memory block of the temporary buffer and blends such pulled data with a second portion of the second set of filtered data.

15 Claims, 8 Drawing Sheets

4XAA Data	8XAA Data

METHODS AND SYSTEMS FOR PERFORMING ANTI-ALIASING OPERATIONS WITH MULTIPLE GRAPHICS PROCESSING UNITS

BACKGROUND OF THE INVENTION

1. Field of the Invention

Embodiments of the present invention relate generally to video processing and more specifically to performing anti-aliasing operations with multiple graphics processing units.

2. Description of the Related Art

Unless otherwise indicated herein, the approaches described in this section are not prior art to the claims in this application and are not admitted to be prior art by inclusion in this section.

Anti-aliasing processing typically occurs during the rendering stage of video processing and is generally used to diminish jaggies, which are stair-like lines that appear at places in an image where there should be smooth, straight lines or curves. One anti-aliasing technique is to obtain several samples of each displayed pixel and compute an average of the samples to determine the color of the pixel. To lessen the amount of time required to perform this technique, one approach is to distribute the computation steps to one or more graphics processing units ("GPUs").

Figure 1A:
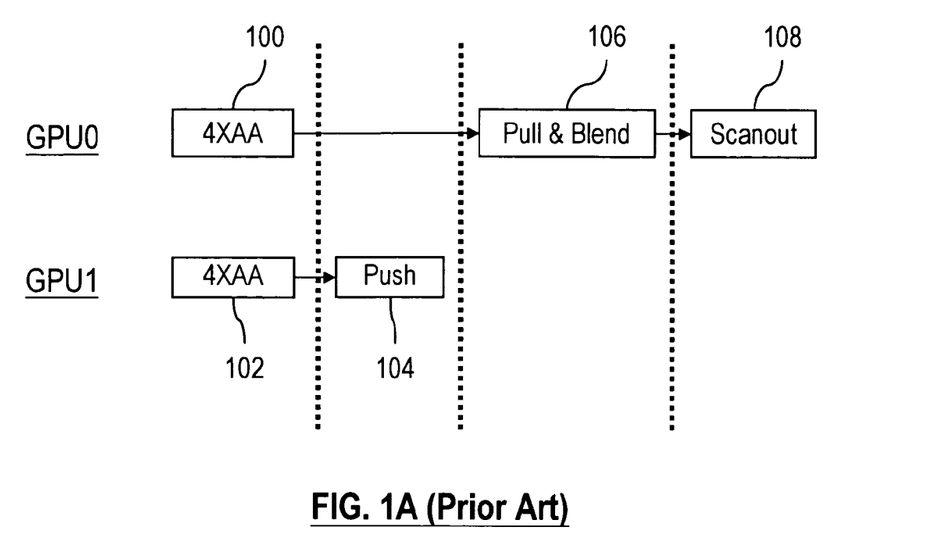
FIG. 1A illustrates one eight-times-sampling anti-aliasing operation using two graphics processing units in a graphics system.
Figure 1B:
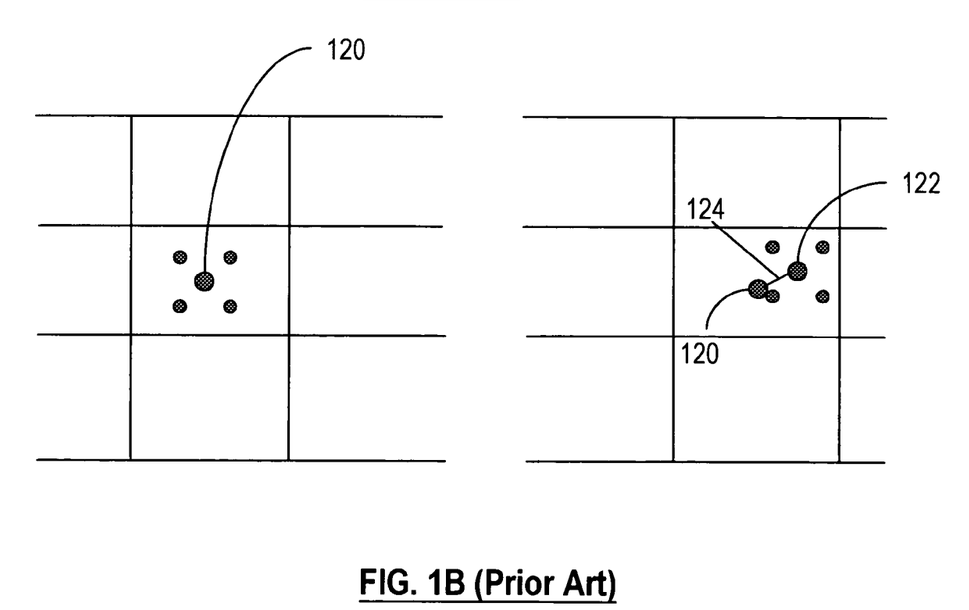
FIG. 1B illustrates one approach of obtaining different samples of a pixel in anti-aliasing processing.

FIG. 1A illustrates one eight-times-sampling anti-aliasing ("8×AA") operation using two GPUs in a graphics system. Specifically, instead of performing anti-aliasing on 8 samples of each displayed pixel by a single GPU, each of two GPUs performs four-times-sampling anti-aliasing operation ("4× AA") on 4 samples per pixel in parallel as represented by blocks 100 and 102. As shown in FIG. 1B, the 4 samples that GPU0 operates on are located around point 120, and the 4 different samples that GPU1 operates on are located around point 122, which corresponds to point 120 plus offset 124.

Suppose GPU0 is the primary GPU in the graphics system, and GPU1 is the secondary GPU. Before GPU0 can transmit its local frame buffer to the display device in block 108 of FIG. A, or otherwise referred to herein as "scanning out," GPU1 transfers the output of block 102 into a temporary buffer in a direct memory access ("DMA") copy operation in block 104. Such an operation is commonly referred to as a "blit." GPU1 effectively "pushes" the results of the 4×AA operation from its local frame buffer to the temporary buffer. GPU0 then needs to pull the data from the temporary buffer and combine the data with the content of its entire local frame buffer in block 106. These two operations are also commonly referred to as a "pull and blend" operation. In this implementation, because both GPU0 and GPU1 access the same memory location of the temporary buffer, GPU0 needs to wait until GPU1 completes its blitting operation before it can proceed with its pull and blend operation.

Figure 1C:
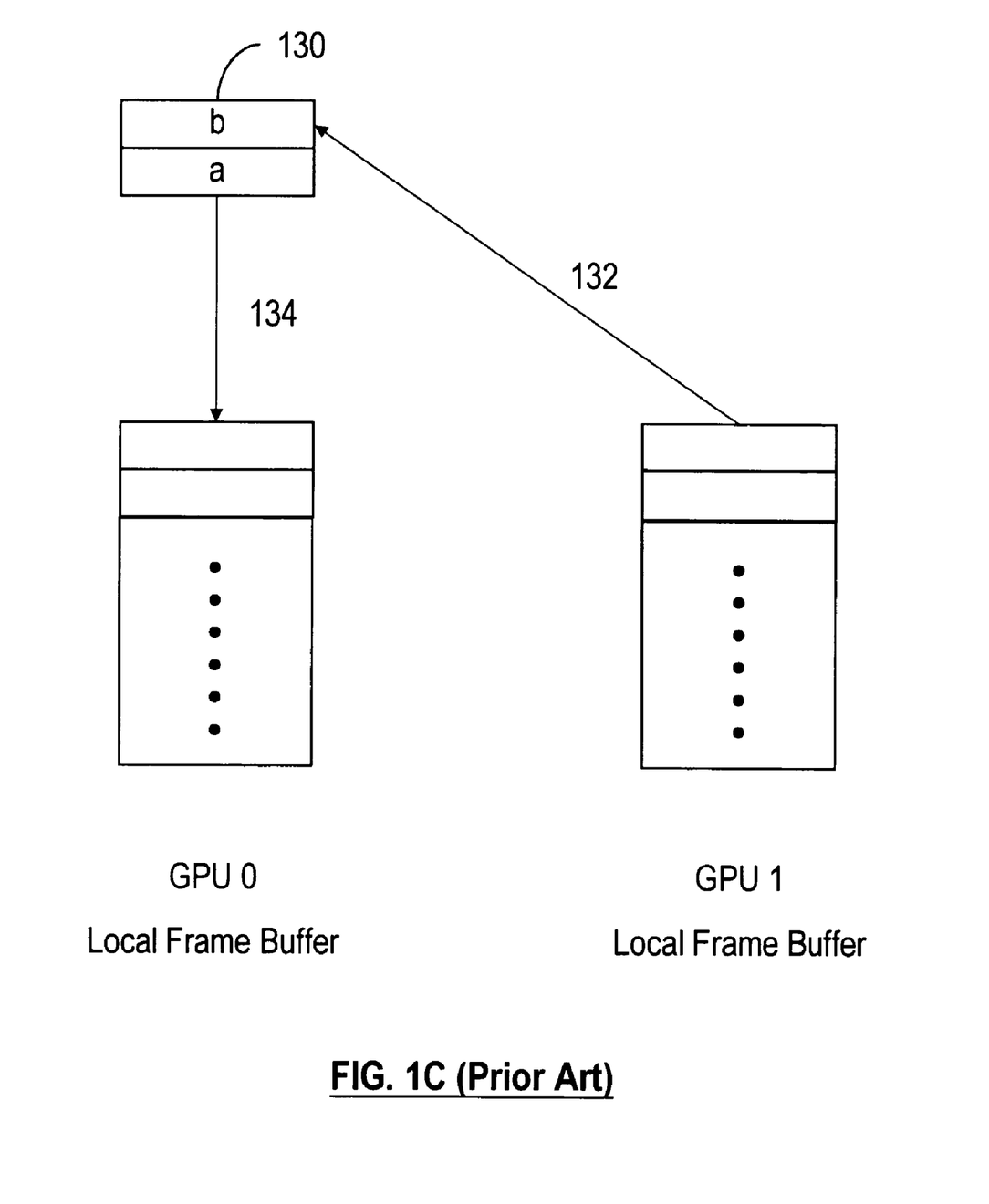
FIG. 1C is a conceptual diagram of a temporary buffer bank and its interactions with the local frame buffers of two graphics processing units.

In an alternative implementation, the push operation in block 104 and the pull and blend operation in block 106 shown in FIG. 1A can potentially overlap. FIG. 1C is a conceptual diagram of a temporary buffer bank and its interactions with the local frame buffers of two GPUs. Temporary buffer bank 130 corresponds to a memory block, which includes two partitions, bank a and bank b. In data transfer 132, GPU1 blits data from its local frame buffer to bank b. In data transfer 134, GPU0 pulls and blends data that have been previously stored in bank a with data from its local frame buffer. Since bank a and bank b occupy different memory locations, data transfer 132 and data transfer 134 can proceed independently. After the completion of the data transfers, banks a and b swap, and the process of pushing and pulling and blending repeats. Even with the use of a swapping temporary buffer bank in this implementation, only a single GPU, GPU0, performs the pulling and blending operation in a multi-GPU system.

As the foregoing illustrates, utilizing only a single GPU in a multi-GPU system to perform the pull and blend operations serializes the anti-aliasing processing for the overall system. Thus, what is needed is a way to increase the efficiency of these pull and blend operations.

SUMMARY OF THE INVENTION

Methods and systems for performing an anti-aliasing operation by multiple graphics processing units are disclosed. The methods and systems utilize a first graphics processing unit to generate a first subset of filtered data resulting from performing anti-aliasing processing and similarly utilize a second graphics processing unit to generate a second subset of filtered data. Then the first graphics processing unit pulls a first portion of the second subset of filtered data from a first memory block of a temporary buffer and blends such pulled data with a first portion of the first subset of filtered data. Overlapping in time with the pulling and blending operation of the first graphics processing unit, the second graphics processing unit pulls a second portion of the first subset of filtered data from a second memory block of the temporary buffer and blends such pulled data with a second portion of the second set of filtered data.

One advantage of the disclosed methods and systems is that they provide a multi-media processing environment capable of performing anti-aliasing operations more efficiently and resulting in better image quality than prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Methods and systems for performing anti-aliasing operation with multiple GPUs are described. In the following description, for the purposes of explanation, numerous specific details are set forth in order to provide a thorough understanding of the present invention. It will be apparent, however, to one skilled in the art that the present invention may be practiced without these specific details.

Throughout this disclosure, one operation is said to "overlap" with another operation, when at least some portions of the two operations are performed at the same time. A "video bridge" generally refers to a direct data connection among the resources of multiple GPUs, such as the frame buffers. A direct data connection among the resources of the GPUs on a single graphics adapter is referred to as an "internal video bridge" or an "on-board video bridge." A direct data connection among the resources of the GPUs on different graphics adapters is referred to as an "external video bridge." A "symmetric" communication link refers to any two-way link with substantially identical or identical downstream and upstream data transmission speed.

Figure 2A:
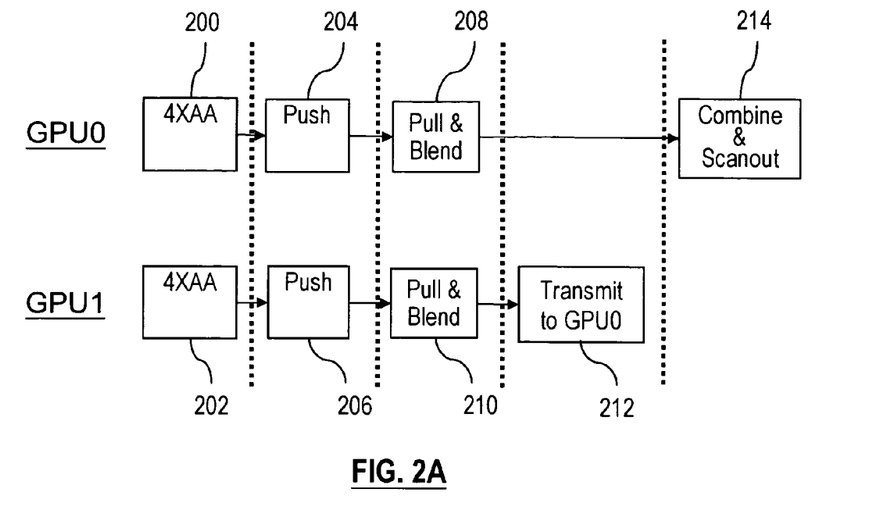
FIG. 2A illustrates one process of performing overlapping push and pull and blend operations in an anti-aliasing operation by two graphics processing units, according to one embodiment of the present invention.

FIG. 2A illustrates one process of performing overlapping push and pull and blend operations in an anti-aliasing operation performed by two GPUs. Specifically, in this 8×AA example, a primary GPU, such as GPU0, performs 4×AA in block 200, and a secondary GPU, such as GPU1, performs 4×AA in block 202 in parallel. As discussed above, for each pixel in a frame, GPU0 performs an anti-aliasing operation on 4 samples, and GPU1 operates on 4 different samples. In block 204, GPU0 pushes the output of block 200 to one location in a temporary buffer. Similarly, in block 206, GPU1 pushes the output of block 202 to another location in the same temporary buffer. In one implementation, GPU0 and GPU1 are synchronized before proceeding to blocks 208 and 210. Subsequent sections described in conjunction with FIG. 6A and FIG. 6B will provide detailed discussions of one type of synchronization mechanism.

GPU0 then pulls and blends the data stored in the temporary buffer with the data in its local frame buffer in block 208. In parallel, GPU1 also pulls and blends the data stored in the temporary buffer with the data in its local frame buffer in block 210. In one implementation, GPU1 transmits the content in a portion of its local frame buffer via a video bridge to GPU0 in block 212, and then GPU0 combines the data from GPU1 with the data also in a portion of its local frame buffer and transmits the combined data to a display device in block 214.

Figure 2B:
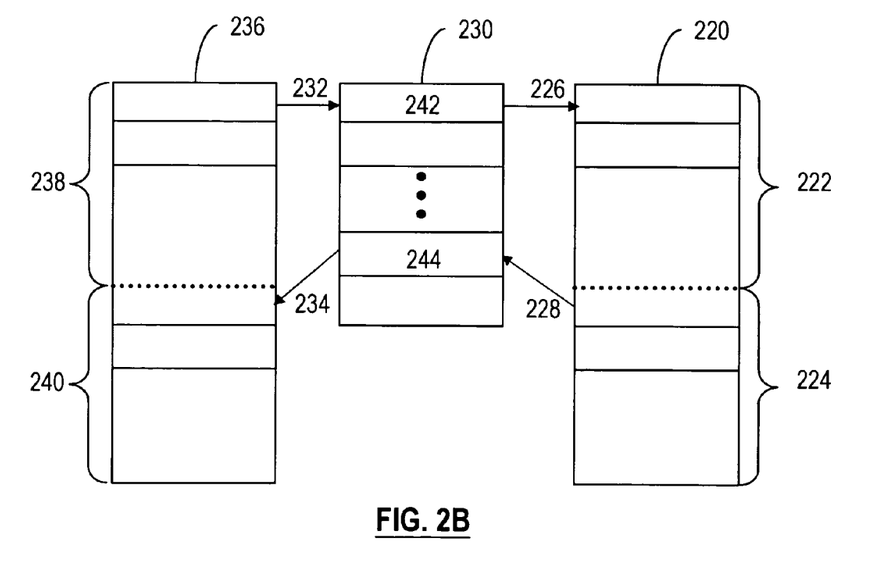
FIG. 2B is a conceptual diagram of a temporary buffer and its interactions with the local frame buffers of two graphics processing units, according to one embodiment of the present invention.

FIG. 2B is a conceptual diagram of a temporary buffer and its interactions with the local frame buffers of two GPUs. In particular, temporary buffer 230 has a block of memory locations for temporary storage. This block of memory locations, however, can reside on one or more memory devices. In one embodiment, each of the local frame buffers of GPU0 and GPU1, or frame buffers 220 and 236, respectively, are divided into two portions, a top portion and a bottom portion. The top portions and the bottom portions do not overlap. The push operations in blocks 204 and 206 correspond to data transfers 228 and 232, respectively. Because the data are pushed to different memory locations of temporary buffer 230, namely, locations 244 and 242, the push operations can occur in parallel. The pull and blend operations in blocks 208 and 210 correspond to data manipulations 226 and 234, respectively. In other words, GPU0 pulls top portion 238 of frame buffer 236 from temporary buffer 230 and blends it with top portion 222 of its own frame buffer 220. Concurrently, GPU1 pulls bottom portion 224 of frame buffer 220 from temporary buffer 230 and blends it with bottom portion 240 of its frame buffer 236. Subsequent sections will discuss various embodiments of graphics systems that utilize temporary buffer 230 to support these overlapping push and pull and blend operations.

Figure 2C:
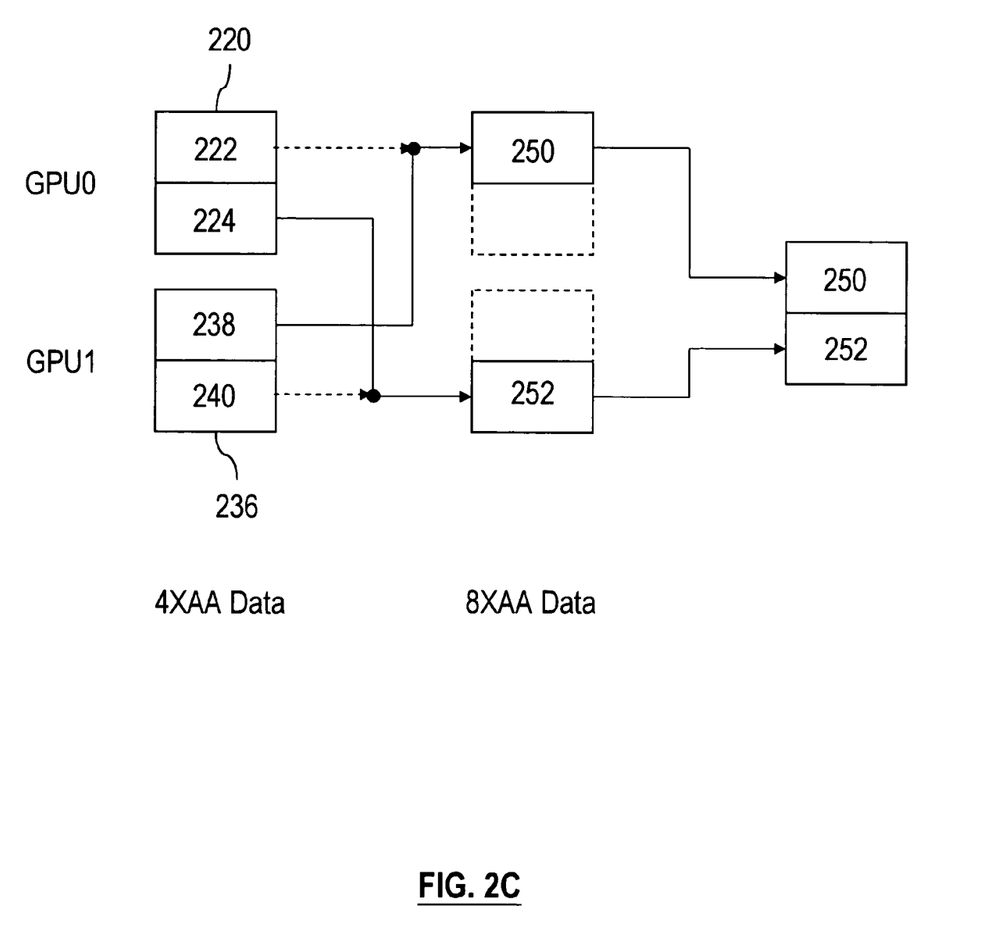
FIG. 2C is a conceptual diagram of one embodiment of manipulating portions of the local frame buffers of two graphics processing units in one eight-times-sampling anti-aliasing operation, according to one embodiment of the present invention.

FIG. 2C is a conceptual diagram of one embodiment of manipulating portions of the local frame buffers of two GPUs in the 8×AA operation discussed above. In particular, GPU0 generates the top portion of the 8×AA results, represented by 250, by pulling top portion 238 of frame buffer 236 and blending it with top portion 222 of its own frame buffer 220 as shown in FIG. 2B. Similarly, GPU1 generates the bottom portion of the 8×AA results, represented by 252, by pulling bottom portion 224 of frame buffer 220 and blending it with bottom portion 240 of its own frame buffer 236. One with ordinary skill in the art will understand that the aforementioned overlapping push and pull and blend techniques may be extended to more than two GPUs and to different anti-aliasing processing modes.

Figure 3:
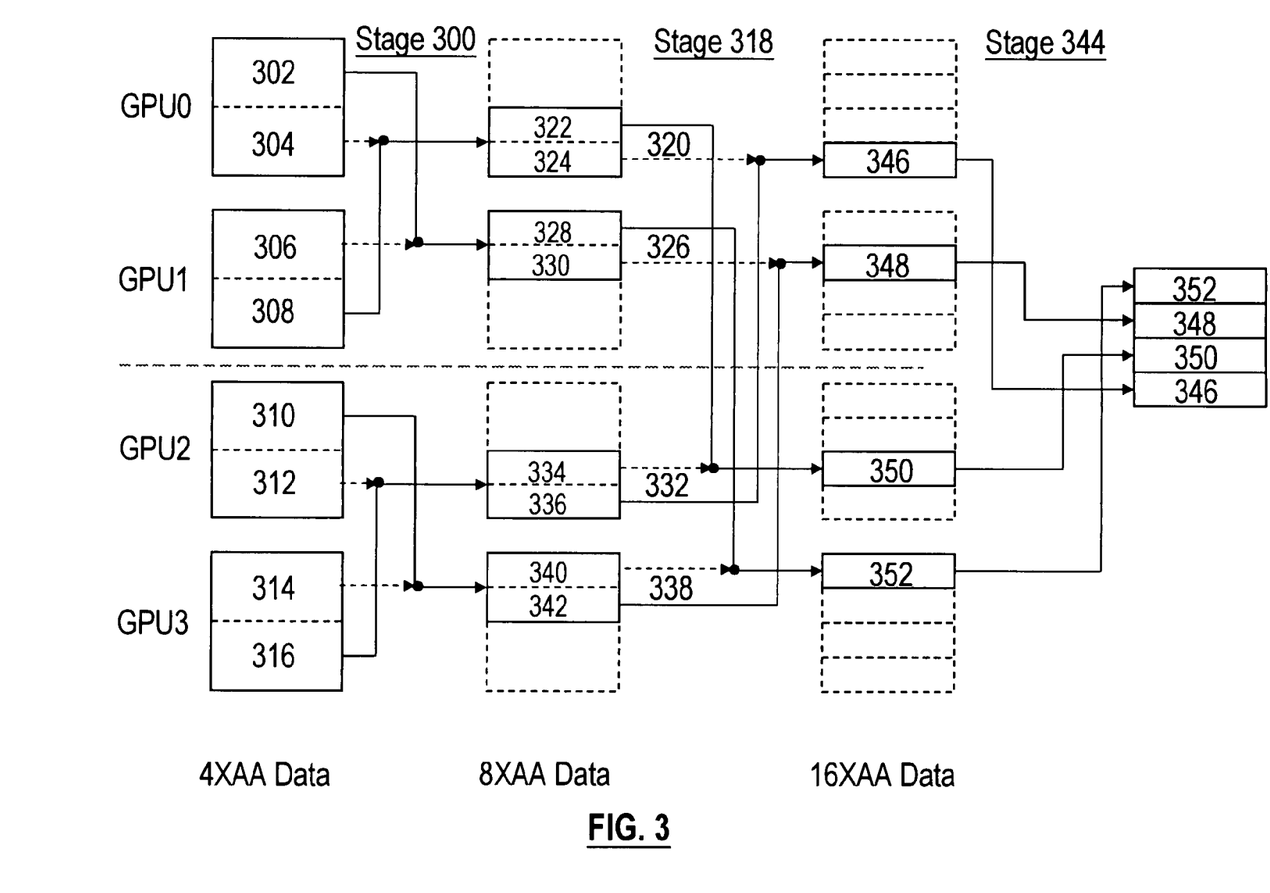
FIG. 3 is a conceptual diagram of one embodiment of manipulating portions of the local frame buffers of four graphics processing units in one sixteen-times-sampling anti-aliasing operation.

FIG. 3 is a conceptual diagram of one embodiment of manipulating portions of the local frame buffers of four GPUs in a sixteen-times-sampling anti-aliasing ("16×AA") operation. In this example, GPU0 is the primary GPU, and GPU1, GPU2, and GPU3 are secondary GPUs. Each of the four GPUs initially performs 4×AA in parallel on different 4 samples for each pixel of each frame. Then, in pull and blend stage 300, GPU0 pulls portion 308 of the frame buffer of GPU1, which is stored in a temporary buffer (not shown in FIG. 3), and blends it with portion 304 of its local frame buffer. The resulting 8×AA data are placed in portion 320 of the frame buffer of GPU0. In parallel, GPU1 generates portion 326, which is within its own frame buffer, by pulling portion 302 of the frame buffer of GPU0, which is also stored in a temporary buffer, and blending it with its own portion 306; GPU2 generates portion 332, which is within its won frame buffer, by pulling portion 316 of the frame buffer of GPU3 and blending it with its own portion 312; and GPU3 generates portion 338 by pulling portion 310 of the frame buffer of GPU2 and blending it with its own portion 314. In one embodiment, portions 320, 326, 332, and 338 occupy the same memory locations as portions 304, 306, 312, and 314, respectively.

Similarly, in pull and blend stage 318, GPU0 pulls portion 336 of the frame buffer of GPU2 and blends it with portion 324 of its local frame buffer. The resulting 16×AA data are placed in portion 346 of the frame buffer of GPU0. In parallel, GPU1 generates portion 348, which is within its own frame buffer, by pulling portion 342 of the frame buffer of GPU3 and blending it with its own portion 330; GPU2 generates portion 350, which is within its own frame buffer, by pulling portion 322 of the frame buffer of GPU0 and blending it with its own portion 334; and GPU3 generates portion 352, which is within its on frame buffer, by pulling portion 328 of the frame buffer of GPU1 and blending it with its own portion 340. In one embodiment, portions 346, 348, 350, and 352 occupy the same memory locations as portions 324, 330, 334, and 340, respectively.

In stage 344, in one implementation, GPU1, GPU2, and GPU3 respectively transmit portions 348, 350, and 352 within their frame buffers to the primary GPU, GPU0, via a dedicated connection, such as a video bridge. GPU0 then combines all the portions of different frame buffers and scans out the combined data to the display device. Alternatively, the GPUs can communicate through system resources, such as system buses and chipsets, to combine the various portions. One with ordinary skill in the art will recognize that the specific portions of the frame buffers used in the pull and blend operations both in the 8×AA and the 16×AA examples above are for illustration purposes only and should not be construed to limit the scope of the claimed invention.

Figure 4:
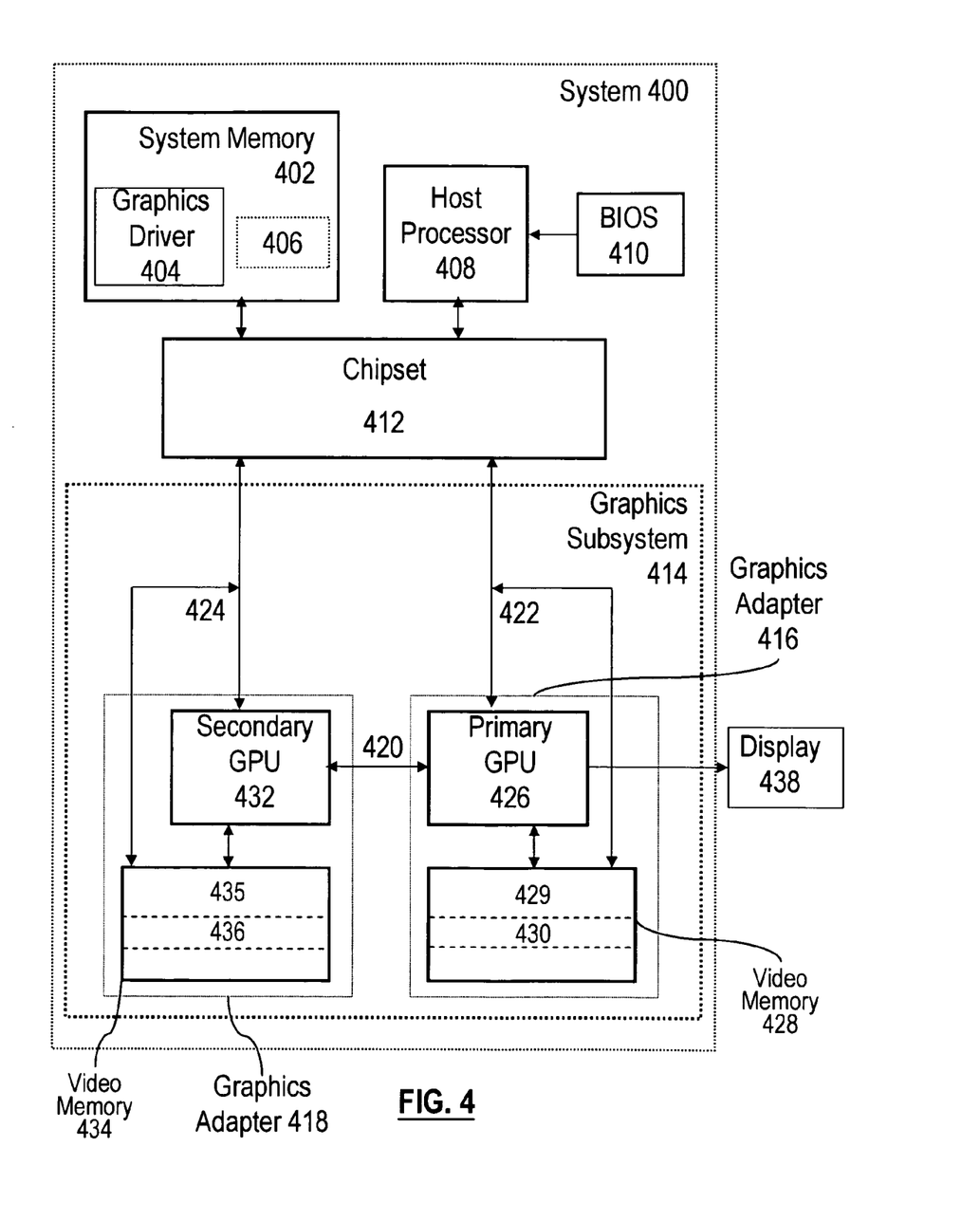
FIG. 4 is a block diagram of a system configured to implement one or more aspects of the present invention.

FIG. 4 is a block diagram of a system configured to implement one or more aspects of the present invention. Without limitation, system 400 may be a desktop computer, server, laptop computer, palm-sized computer, tablet computer, game console, cellular telephone, hand-held device, mobile device, computer based simulator, or the like. System 400 includes host processor 408, BIOS 410, system memory 402, and chipset 412 that is directly coupled to graphics subsystem 414. BIOS 410 is a program stored in read only memory ("ROM") or flash memory that is run at bootup. Graphics subsystem 414 includes graphics adapters 416 and 418, each with a single GPU, namely primary GPU 426 and secondary GPU 432, respectively.

A device driver, graphics driver 404, stored within system memory 402, configures primary GPU 426 and secondary GPU 432 to share the graphics processing workload performed by system 400 and to communicate with applications that are executed by host processor 408. In one embodiment, graphics driver 404 generates and places a stream of commands in a "push buffer," which is then transmitted to the GPUs. When the commands are executed, certain tasks, which are defined by the commands, are carried out by the GPUs.

In some embodiments of system 400, chipset 412 provides interfaces to host processor 408, memory devices, storage devices, graphics devices, input/output ("I/O") devices, media playback devices, network devices, and the like. Some examples of the interfaces include, without limitation, Advanced Technology Attachment ("ATA") bus, Accelerated Graphics Port ("AGP"), Universal Serial Bus ("USB"), Peripheral Component Interface ("PCI"), and PCI-Express®. It should be apparent to a person skilled in the art to implement chipset 412 in two or more discrete devices, each of which supporting a distinct set of interfaces.

Connections 422 and 424 support symmetric communication links, such as, without limitation, PCI-Express®. Connection 420 can be any technically feasible scalable bus that provides a direct connection between primary GPU 426 and secondary GPU 432. In system 400, this direct connection is between two physically distinct graphics adapters, or graphics adapters 416 and 418; thus the connection is also referred to as an external video bridge. One embodiment of connection 420 can be implemented using the NVIDIA® SLI™ multi-GPU technology.

As shown, primary GPU 426 within graphics adapter 416 is responsible for outputting image data to display 438. Display 438 may include one or more display devices, such as, without limitation, a cathode ray tube ("CRT"), liquid crystal display ("LCD"), or the like. Primary GPU 426 is also coupled to video memory 428, which may be used to store image data and program instructions. In one embodiment, primary frame buffer 429, which is a portion of video memory 428 is allocated to store image data. Secondary GPU 432 within graphics adapter 418 is coupled to video memory 434, which may also be used to store image data and program instructions. Similarly, one embodiment of video memory 434 has an allocated portion, secondary frame buffer 435, to store image data. Primary GPU 426 does not have to be functionally identical to secondary GPU 432. In addition, the sizes of video memories 428 and 434 and how they are utilized by graphics adapters 416 and 418, respectively, do not have to be identical.

To illustrate performing the overlapping push and pull and blend operations discussed above in system 400, suppose one embodiment of system 400 has allocated a block of memory from system memory 402 for use as a temporary buffer, which is shown in FIG. 4 as temporary buffer 406. First, graphics driver 404 places a number of commands in the push buffer, one of which is a push command for primary GPU 426 and the other is a push command for secondary GPU 432. In conjunction with FIG. 2B, when primary GPU 426 executes the push command, it causes data transfer 228 from primary frame buffer 429 to a location in temporary buffer 406 through connection 422 and chipset 412. Similarly, when secondary GPU 432 executes the push command, it causes data transfer 232 shown in FIG. 2B from secondary frame buffer 435 to another location of temporary buffer 406 through connection 424 and chipset 412. Other commands in the push buffer can be the "pull and blend" commands for primary GPU 426 and secondary GPU 432. When these commands are executed, primary GPU 426 and secondary GPU 432 cause data manipulations 226 and 234 also from different locations of temporary buffer 406 to primary frame buffer 429 and secondary frame buffer 435, respectively, through chipset 412. In this implementation, although graphics subsystem 414 needs to compete for the resources of chipset 412, which may be shared by other devices, it can still carry out the overlapping push and pull and blend operations.

In an alternative implementation, graphics driver 404 can set aside memory blocks in video memories in graphics subsystem 414, instead of in system memory 402 for use as temporary buffers, such as temporary buffers 430 and 436 for primary GPU 426 and secondary GPU 432, respectively. Again in conjunction with FIG. 2B, when primary GPU 426 executes the push command, in one implementation, it causes data transfer 228 from primary frame buffer 429 to temporary buffer 436 through connections 422, 424, and chipset 412. Alternatively, data transfer 228 can take place over connection 420. Similarly, when secondary GPU 432 executes the push command, it causes data transfer 232 shown in FIG. 2B from secondary frame buffer 435 to temporary buffer 430 through either connections 424, 422, and chipset 412 or connection 420. Other commands in the push buffer can be the "pull and blend" commands for primary GPU 426 and secondary GPU 432. When such a command is executed by primary GPU 426, data manipulation 226 between temporary buffer 430 and primary frame buffer 429 occurs. Similarly, when the command is executed by secondary GPU 432, data manipulation 234 between temporary buffer 436 and secondary frame buffer 435 occurs. In this implementation, graphics subsystem 414 does not depend on the resources of chipset 412 to carry out the overlapping push and pull and blend operations.

Figure 5:
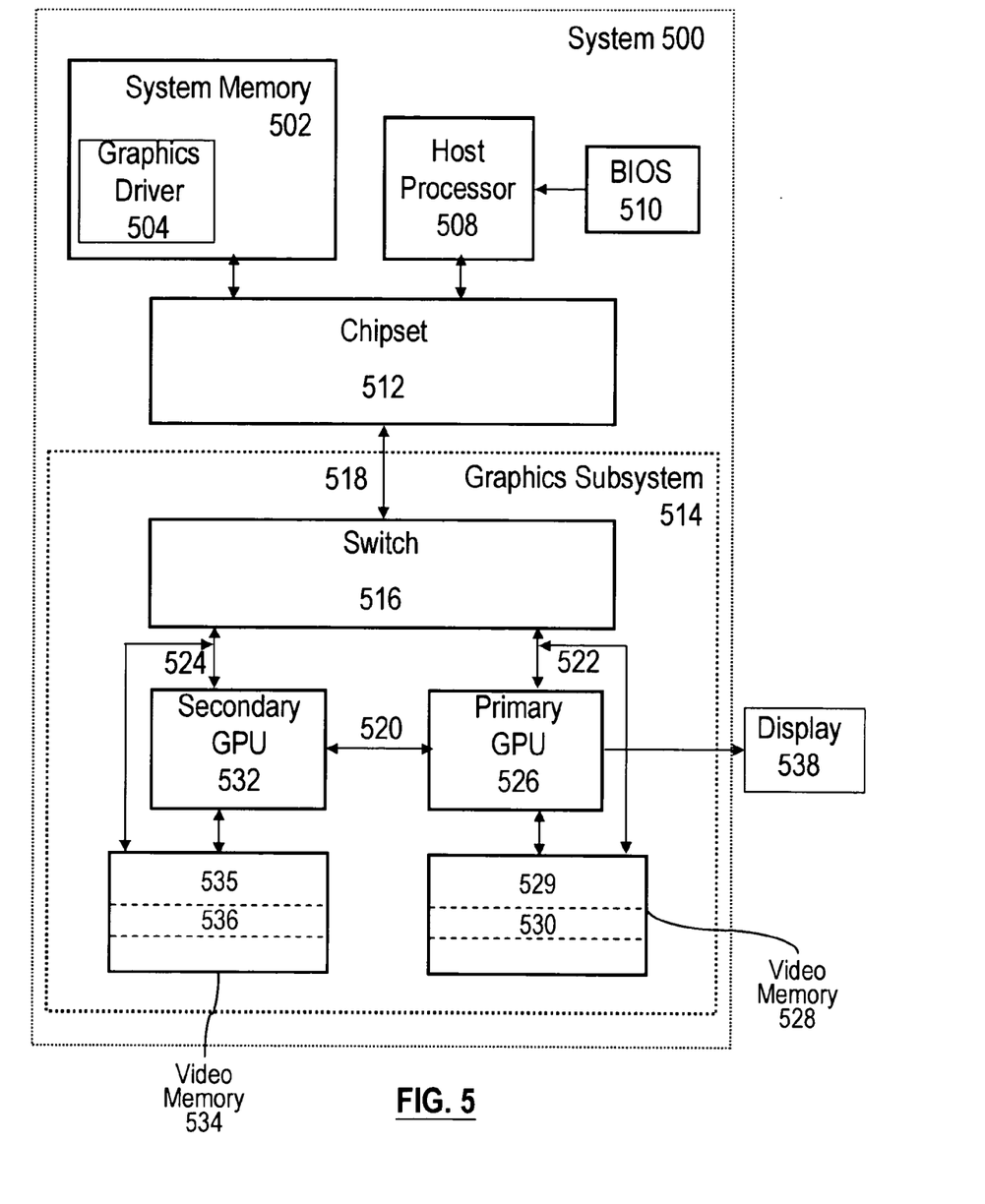
FIG. 5 is a block diagram of another system configured to implement one or more aspects of the present invention.

FIG. 5 is a block diagram of another system configured to implement one or more aspects of the present invention. System 500 includes system memory 502, host processor 508, BIOS 510, video memory 528, video memory 534 and display 538. System 500 differs from system 400 in two main respects: 1) its graphics subsystem 514 is a single graphics adapter with two GPUs, such as primary GPU 526 and secondary GPU 532; and 2) graphics subsystem 514 includes switch 516, which provides an interface between chipset 512 and each of primary GPU 526 and secondary GPU 532 via connection 522 and connection 524, respectively. In some embodiments of graphics subsystem 514, switch 516 provides an indirect interface between primary GPU 526 and secondary GPU 532 through the combination of connections 522 and 524. Switch 516 may also include interfaces to other devices.

Similar to connections 422 and 424 discussed above, connections 518, 522, and 524 also use symmetric communication links, such as, without limitation, PCI-Express®. In addition, since connection 520 is between two GPUs on a single graphics adapter, it is also referred to as an internal video bridge or an on-board video bridge.

To perform the overlapping push and pull and blend operations in system 500, in one embodiment, graphics driver 504 sets aside memory blocks from video memories in graphics subsystem 514 for use as temporary buffers, such as temporary buffers 530 and 536 for primary GPU 526 and secondary GPU 532, respectively. In conjunction with FIG. 2B, when primary GPU 526 executes the push command, it causes data transfer 228 from primary frame buffer 529 to temporary buffer 536 through connection 520. Similarly, when secondary GPU 532 executes the push command, it causes data transfer 232 shown in FIG. 2B from secondary frame buffer 535 to temporary buffer 530 through connection 520. Other commands in the push buffer can be the "pull and blend" commands for primary GPU 526 and secondary GPU 532. When such a command is executed by primary GPU 526, data manipulation 226 between temporary buffer 530 and primary frame buffer 529 occurs. Similarly, when the command is executed by secondary GPU 532, data manipulation 234 between temporary buffer 536 and secondary frame buffer 535 occurs. Alternatively, instead of using connection 520, switch 516 and connections 522 and 524 can be used to facilitate data transfers 228 and 232 and data manipulations 226 and 234. In both of these embodiments, graphics subsystem 514 does not depend on the resources of chipset 512 to carry out the overlapping push and pull and blend operations.

It should be apparent to one of ordinary skill in the art that two or more graphics subsystems 514 may be included in a system. For example, such a system can include two graphics adapters, such as two graphics subsystems 514. The two graphics adapters can be connected by an external video bridge to lessen or to completely avoid any reliance on the shared system resources, such as, without limitation, the chipset or the system buses. Such a system can carry out the aforementioned overlapping push and pull and blend operations with even greater efficiencies than a single graphics adapter implementation.

Although graphics subsystems 414 and 514 of systems 400 and 500, respectively, are shown to provide certain graphics processing capabilities, alternative embodiments of graphics subsystems 414 and 514 may process additional types of data, such as audio data, multimedia data, or the like.

Figure 6A:
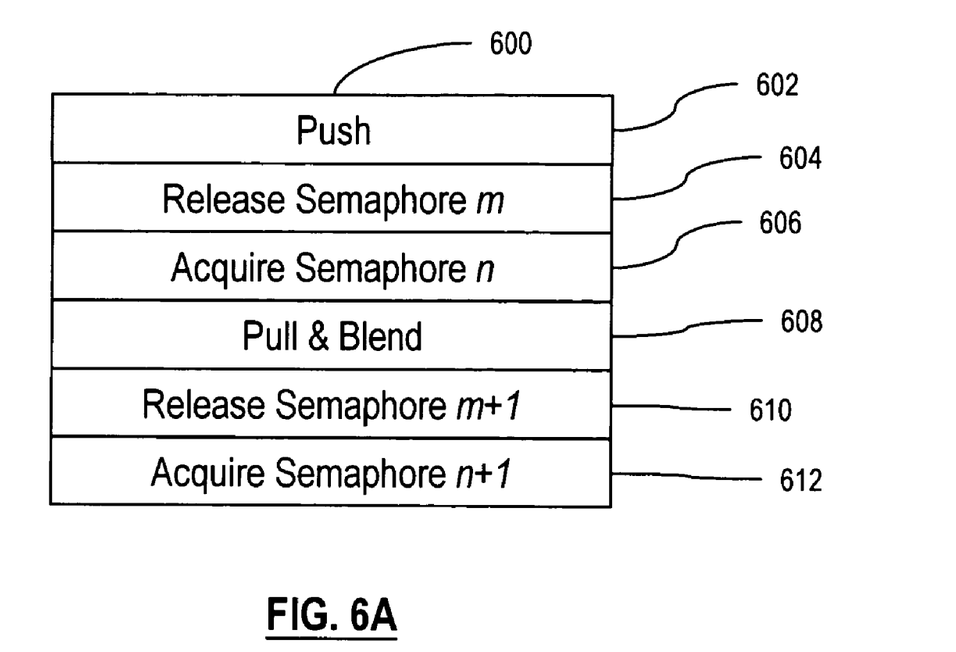
FIG. 6A is a conceptual diagram of command buffers containing a sequence of commands for a primary graphics processing unit to synchronize with a secondary graphics processing unit, according to one embodiment of the invention.
Figure 6B:
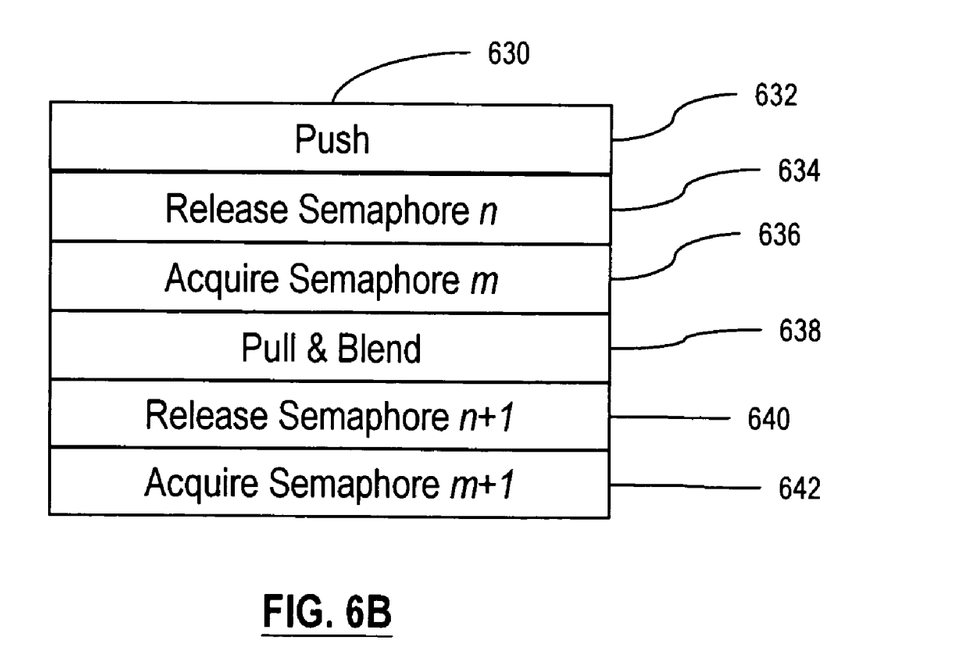
FIG. 6B is a conceptual diagram of command buffers containing a sequence of commands for a secondary graphics processing unit to synchronize with a primary graphics processing unit, according to one embodiment of the invention.

FIGS. 6A and 6B are conceptual diagrams of command buffers containing a sequence of commands that synchronize the primary GPU, such as 426 in system 400 and 526 in system 500, and the secondary GPU, such as 432 in system 400 and 532 in system 500, according to one embodiment of the invention. Using system 500 as an example, graphics driver 504 uses semaphores to synchronize primary GPU 526 and secondary GPU 532 enabling the GPUs to perform separate processing tasks. A semaphore is a pointer to a specific address in system memory. A semaphore may be released or acquired. When a GPU executes a release semaphore command, the GPU writes a specific value to the memory location associated with the semaphore. When a GPU executes an acquire semaphore command, the GPU reads the memory location associated with the semaphore and compares the value of that memory location with the value reflected in the acquire semaphore command. The two values not matching indicates that the semaphore associated with the acquire semaphore command has not yet been released. If there is no match, the GPU executing the acquire semaphore command continues reading the memory location associated with the semaphore until a match is found. Consequently, the GPU executing the acquire semaphore command does not execute any additional commands contained in the command buffer until a match is found.

For example, assume that primary GPU 526 is directed to release a semaphore having a value of 6 and then secondary GPU 532 is directed to acquire the semaphore having a value of 6. Secondary GPU 532 will continue reading the system memory location associated with the semaphore until that memory location contains a value of 6. More importantly, secondary GPU 532 will not execute the next buffer command in the push buffer until the memory location contains a value of 6, which only occurs when primary GPU 526 releases the semaphore having a value of 6.

In conjunction with system 500 show in FIG. 5, FIG. 6A is a conceptual diagram of push buffer 600 containing commands that are executed by primary GPU 526. For illustration purposes, suppose the GPUs are configured to perform the 8×AA operation discussed above, and primary frame buffer 529 and secondary frame buffer 535 contain the data resulting from 4×AA operations. Command 602 causes primary GPU 526 to push the image data stored in the bottom portion of primary frame buffer 529 to temporary buffer 536. Then command 604 causes primary GPU 526 to release semaphore m to indicate the completion of the push operation. Before primary GPU 526 can proceed to execute command 608, or the pull and blend operation, it waits for the release of semaphore n by secondary GPU 532. After semaphore n is successfully acquired according to command 606, command 608 causes primary GPU 526 to pull and blend image data, which represent the top portion of secondary frame buffer 535 and have been stored in temporary buffer 530, with the top portion of its primary frame buffer 529. Upon completion of the pull and blend operation, command 610 causes primary GPU 526 to release semaphore m+1, and command 612 causes primary GPU 526 to acquire semaphore n+1.

FIG. 6B is a conceptual diagram of a command buffer 630 containing a sequence of commands that are executed by secondary GPU 532. Command 632 causes secondary GPU 532 to push the image data stored in the top portion of secondary frame buffer 535 to temporary buffer 530. Then command 634 causes secondary GPU 532 to release semaphore n to indicate the completion of the push operation. Before secondary GPU 532 can proceed to execute command 638, or the pull and blend operation, it waits for the release of semaphore m by primary GPU 526. After semaphore m is successfully acquired according to command 636, command 638 causes secondary GPU 532 to pull and blend image data, which represent the bottom portion of primary frame buffer 529 and have been stored in temporary buffer 536, with the bottom portion of its secondary frame buffer 535. Upon completion of the pull and blend operation, command 640 causes secondary GPU 532 to release semaphore n+1, and command 642 causes secondary GPU 532 to acquire semaphore m+1.

One embodiment of the aforementioned semaphore mechanism uses bit masks to designate the intended GPU to execute commands. For example, in a two-bit-mask scheme, a bit mask of 0×1, 0×2, or 0×f corresponds to a primary GPU, a secondary GPU, and all GPUs, respectively. Thus, a command with the bit mask of 0×1 would configure the primary GPU to execute subsequent commands in the push buffer, while the secondary GPU would ignore the subsequent commands. A command with the bit mask of 0×f would configure both the primary GPU and the secondary GPU to execute subsequent commands in the push buffer.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A graphics system for performing an anti-aliasing operation to generate filtered data for display, the graphics system comprising:
   a first graphics processing unit coupled to a first video memory, wherein said first video memory further includes a first frame buffer containing a first subset of said filtered data;
   a second graphics processing unit coupled to a second video memory, wherein said second video memory further includes a second frame buffer containing a second subset of said filtered data; and
   a temporary buffer, coupled to said first frame buffer and said second frame buffer each via a symmetric communication link, wherein
   said second graphics processing unit pushes content from a first portion of said second frame buffer to a first memory block of said temporary buffer,
   said first graphics processing unit pushes content from a second portion of said first frame buffer to a second memory block of said temporary buffer,
   said first graphics processing unit pulls and blends said content from said first memory block of said temporary buffer with content in a first portion of said first frame buffer; and
   said second graphics processing unit, in parallel with said first processing unit, pulls and blends said content from said second memory block of said temporary buffer with content in a second portion of said second frame buffer.

2. The graphics system of claim 1, wherein operations of said first graphics processing unit and said second graphics unit are synchronized through uses of semaphores.

3. The graphics system of claim 2, wherein said first graphics processing unit waits for the release of a semaphore, indicative of when said second graphics processing unit completes pushing the content in said first portion of said second frame buffer into said temporary buffer, before proceeding to pull from said temporary buffer and blend with the content in said first portion of said first frame buffer.

4. The graphics system of claim 2, wherein said second graphics processing unit waits for the release of a semaphore, indicative of when said first graphics processing unit completes pushing said the content in second portion of said first frame buffer into said temporary buffer, before proceeding to pull from said temporary buffer and blend with the content in said second portion of said second frame buffer.

5. The graphics system of claim 1, wherein said first memory block of said temporary buffer resides in said first video memory.

6. The graphics system of claim 1, wherein said second memory block of said temporary buffer resides in said second video memory.

7. The graphics system of claim 1, wherein said first graphics processing unit and said second graphics processing unit are coupled by a switch that supports symmetric communication links.

8. A system, comprising:
   a chipset;
   a host processor, coupled to said chipset;
   a system memory, coupled to said chipset and including a graphics driver, coupled to said chipset;
   a graphics subsystem, coupled to said chipset, further including,
      a first graphics processing unit coupled to a first video memory, wherein
      said first video memory further includes a first frame buffer;
      a second graphics processing unit coupled to a second video memory,
      wherein said second video memory further includes a second frame buffer; and
   a temporary buffer, coupled to each of said first frame buffer and said second frame buffer via a symmetric communication link, wherein
   said graphics driver instructs said graphics subsystem to perform an anti-aliasing operation, wherein
      said second graphics processing unit pushes content from a first portion of said second frame buffer to a first memory block of said temporary buffer,
      said first graphics processing unit pushes content from a second portion of said first frame buffer to a second memory block of said temporary buffer,
      said first graphics processing unit pulls and blends said content from said first memory block of said temporary buffer with content in a first portion of said first frame buffer, and
      said second graphics processing unit, in parallel with said first processing unit, pulls and blends said content from said second memory block of said temporary buffer with content in a second portion of said second frame buffer.

9. The system of claim 8, wherein said graphics driver issues semaphore commands to said first graphics processing unit and said second graphics unit to synchronize operations.

10. The system of claim 9, wherein one of said semaphore commands causes said first graphics processing unit to wait for said second graphics processing unit to complete pushing the content in said first portion of said second frame buffer into said temporary buffer before proceeding to pull from said temporary buffer and blend with the content in said first portion of said first frame buffer.

11. The system of claim 9, wherein one of said semaphore commands causes said second graphics processing unit to wait for said first graphics processing unit to complete pushing the content in said second portion of said first frame buffer into said temporary buffer before proceeding to pull from said temporary buffer and blend with the content in said second portion of said second frame buffer.

12. The system of claim 8, wherein said first memory block of said temporary buffer resides in said first video memory.

13. The system of claim 8, wherein said second memory block of said temporary buffer resides in said second video memory.

14. The system of claim 8, wherein said temporary buffer resides in said system memory.

15. The system of claim 8, wherein said first graphics processing unit and said second graphics processing unit are coupled by a switch that supports symmetric communication links.

* * * * *